T. N. SHIPTON.
Clover Huller.
No. 6,284.
Patented April 10, 1849.
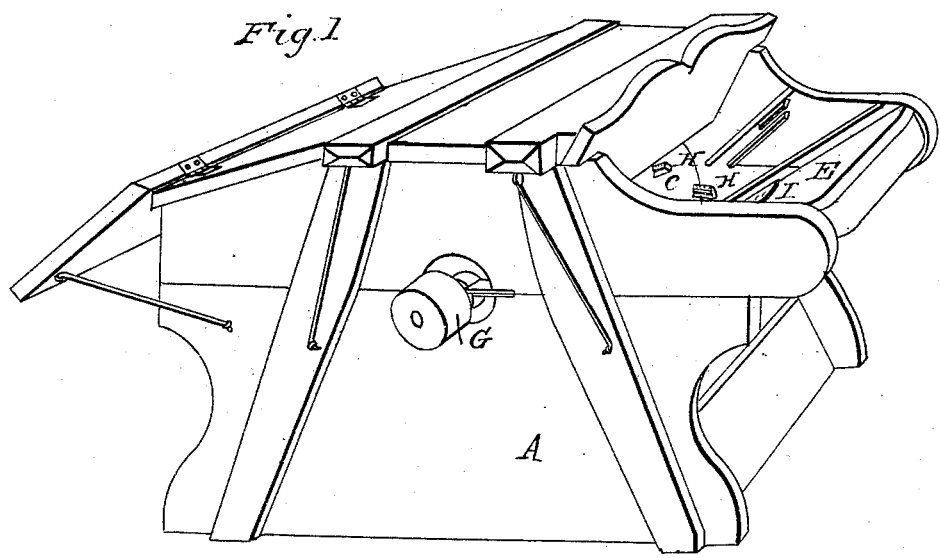
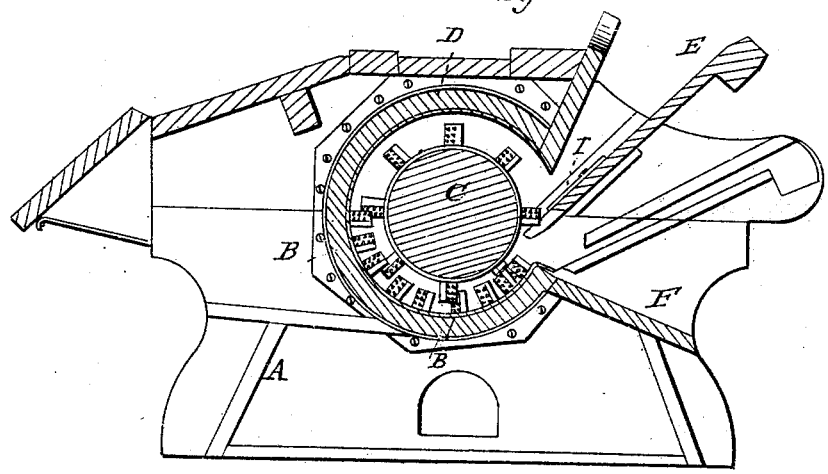
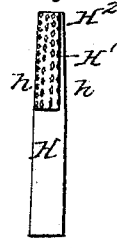
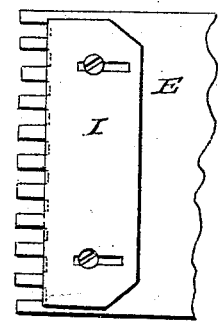

UNITED STATES PATENT OFFICE.

THOMAS N. SHIPTON, OF NEAR LEWISTOWN, PENNSYLVANIA.

THRESHING-MACHINE.

Specification of Letters Patent No. 6,284, dated April 10, 1849.

*To all whom it may concern:*

Be it known that I, THOMAS N. SHIPTON, of near Lewistown, in the county of Mifflin and State of Pennsylvania, have invented a new and useful Improvement in Machines for Threshing Grain and Hulling Clover-Seed, which is described as follows, reference being had to the annexed drawings of the same, making part of this specification.

Figure 1, is a perspective view of the machine. Fig. 2, is a vertical longitudinal section through the center of the same arranged for hulling clover seeds. Fig. 3, is a perspective view of one of the improved teeth drawn to its full size. Fig. 4, is a section of the tooth. Fig. 5, is an elevation of the tooth. Fig. 6, is a plan of the feed board and gage plate Similar letters in the several figures refer to corresponding parts.

The frame A, concave B, cylinder C, cap D, feeding board E, discharging board F and gearing G, may be made and arranged in the manner represented in the drawings, or in any convenient way. As I intend to make no particular claim to any of these parts I shall, therefore not give a minute description of them; but I shall confine the description to the part of the machine intended to be claimed, which relates particularly to the peculiar construction of the teeth H inserted into the concave and cylinder by which the machine is adapted to the hulling of clover seed and threshing grain by merely changing the motion of the cylinder and removing two or three of the toothed segments of the concave and lowering the inclined feeding board.

Each tooth is made after the form represented in Figs. 3, 4, and 5, which represent a combination of three solids of different figures and designed for different purposes—namely a semi ellipse H′, jagged on its convex surface for hulling clover seeds when the cylinder into which they are inserted, is turned to the left—a trapezoid H², and smooth on its three sides for threshing grain from straw when the cylinder is turned to the right, and a rectangular shank H to be driven into the convex surface of the cylinder and into the concave surface of the bed for holding the tooth firmly in its required position. The trapezoidal portion of the tooth is made thicker than the semi elliptical portion in order to form shoulders $h$ or projections, for the purpose of protecting the jagged points from injury when the machine is used as a grain thresher by first striking the substance to be operated on and moving it out of the way of the jagged ends or points. These shoulders also serve (when the machine is used as a clover huller) as beaters to beat the seed from the hulls, in conjunction with the jagged points. The shank which is driven into the cylinder is made about the thickness of the largest part of the trapezoid and a little longer than the semi-ellipse. The inclined feed board E is notched on its lower edge forming alternate spaces and teeth or projections, the teeth of the cylinder passing through said spaces and the teeth of the board filling the spaces between the teeth of the cylinder for the purpose of preventing the clover hulls escaping from the machine before they are acted on by the teeth of the cylinder and concave.

I is a metallic slide arranged next the toothed edge of the inclined board for the purpose of partly closing the spaces between the teeth of the board. This slide moves over the shanks of screws inserted into the board being perforated with oblong slots to give it sufficient play for the purpose of closing the spaces to the degree required.

The operation of the machine is as follows: The clover hulls are placed on the inclined feed board E and conducted by it to the teeth of the revolving cylinder which conveys them around in the space between the cylinder C and cap D to the teeth of the concave and when they come in contact with the jagged points and shoulders of the teeth of the concave the seed is separated from the hulls and discharged with them upon the inclined board F below the feeding board E and conducted thence to a receiver; or to a winnowing machine.

In order to adapt the machine to the threshing of grain all that is necessary to be done is to remove the cap or cover D, and one or two of the toothed segments B of the concave and lower the feed board and change the direction of the movement of the cylinder. The smooth sides of the teeth will then strike the grain and straw and convey the same through and among the teeth of the concave separating the one from the other and discharging the whole mass of straw and grain on to a separator (not represented) arranged at the rear of the cylinder and concave which will separate the grain from the straw in the usual manner.

What I claim as my invention and desire to secure by Letters Patent, is—

The peculiar form of the teeth H by which clover seed can be hulled and grain threshed in the same machine each of said teeth being a combination of a jagged semi ellipse, a trapezoid, and a shank as herein described and represented.

In testimony whereof I have hereunto signed my name before two subscribing witnesses this 22d day of May 1848.

T. N. SHIPTON.

Witnesses:
   WM. P. ELLIOT,
   L. WASHINGTON, Sen.